(12) United States Patent
Yamamoto

(10) Patent No.: US 6,512,632 B2
(45) Date of Patent: Jan. 28, 2003

(54) DRIVE MECHANISM OF FOCUSING DEVICE

(75) Inventor: Souji Yamamoto, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 25 days.

(21) Appl. No.: 09/729,592

(22) Filed: Dec. 4, 2000

(65) Prior Publication Data

US 2002/0159147 A1 Oct. 31, 2002

(30) Foreign Application Priority Data

Dec. 6, 1999 (JP) .......................................... 11-346461

(51) Int. Cl.$^7$ ............................................. G02B 21/00
(52) U.S. Cl. ..................... 359/383; 359/392; 359/393; 359/384
(58) Field of Search ................................ 359/383, 392, 359/393, 384, 368, 391, 379; 74/10.52, 10.54, 545, 490.12

(56) References Cited

U.S. PATENT DOCUMENTS

| | | | | |
|---|---|---|---|---|
| 4,269,285 A | * | 5/1981 | Ohkoshi et al. | 187/244 |
| 5,022,619 A | * | 6/1991 | Mamada | 248/187.1 |
| 5,655,419 A | * | 8/1997 | Aoki | 359/383 |
| 5,771,749 A | * | 6/1998 | Yoneyama | 359/392 |

FOREIGN PATENT DOCUMENTS

| | | |
|---|---|---|
| JP | 3-111805 | 5/1991 |
| JP | 10-26730 | 1/1998 |

\* cited by examiner

*Primary Examiner*—Mohammad Sikder
(74) *Attorney, Agent, or Firm*—Frishauf, Holtz, Goodman & Chick, P.C.

(57) ABSTRACT

A drive mechanism includes a fine-movement ring provided at each of both ends of a fine-movement coupling shaft, disposed outside each of rough-movement handles, and having a smaller outside diameter than an outside diameter of each of the rough-movement handles, and a fine-movement handle detachably attached to at least one of the fine-movement rings.

6 Claims, 5 Drawing Sheets

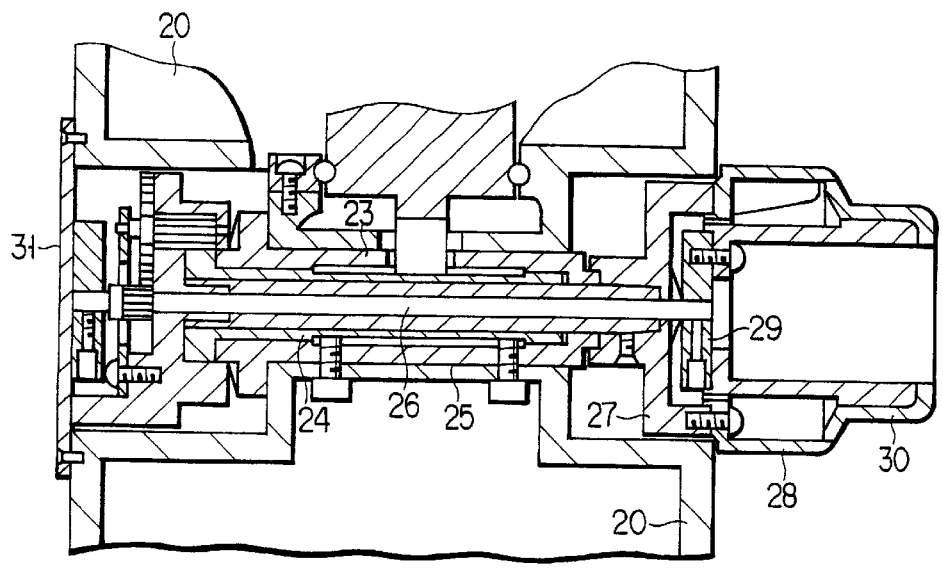
FIG. 3 PRIOR ART
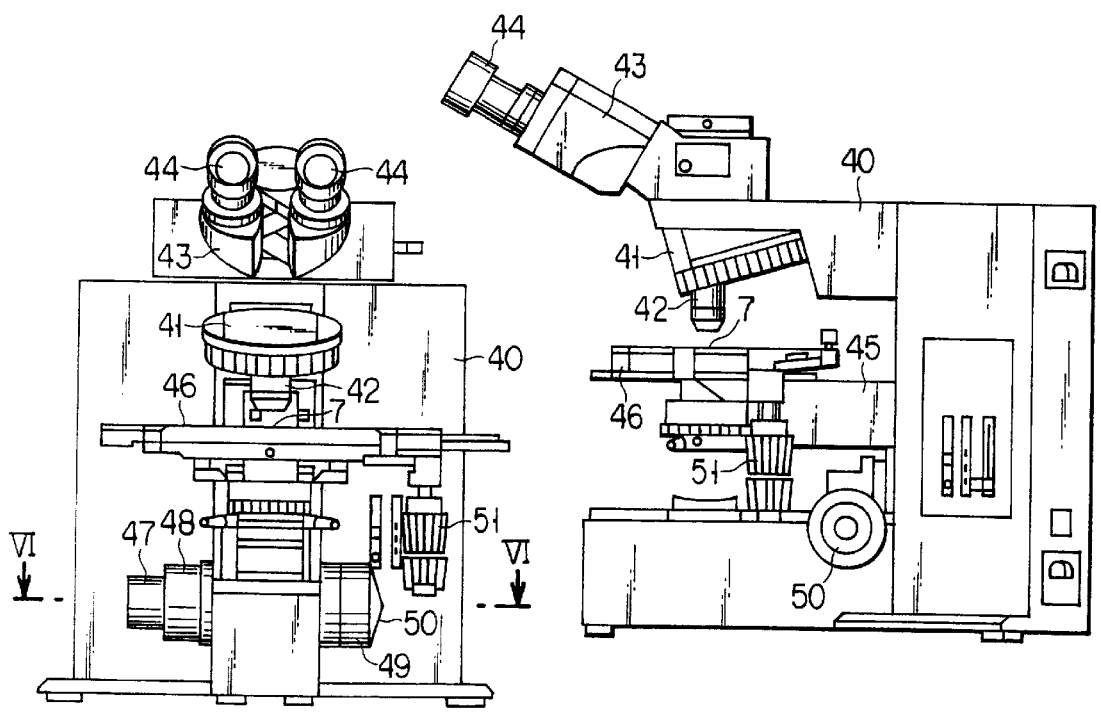
FIG. 4
FIG. 5

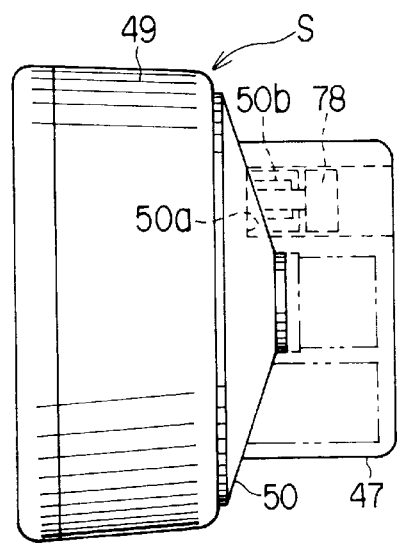
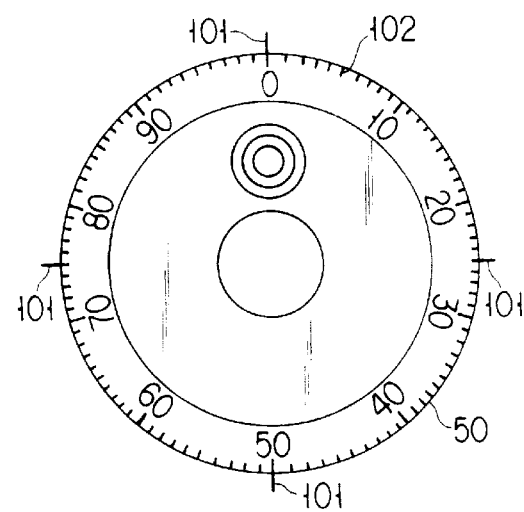
FIG. 9A
FIG. 9B
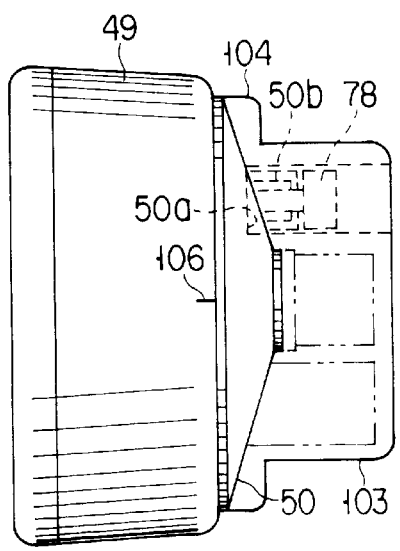
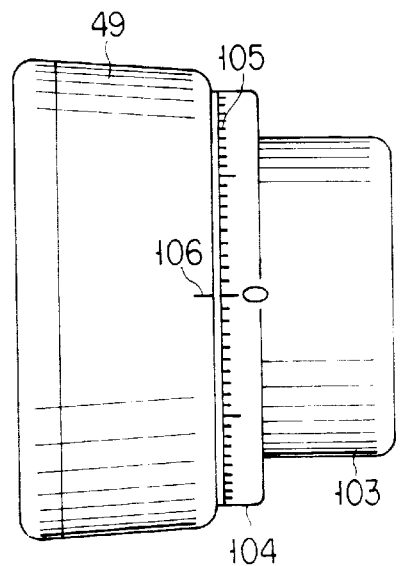
FIG. 10A
FIG. 10B

DRIVE MECHANISM OF FOCUSING DEVICE

CROSS-REFERENCE TO RELATED APPLICATIONS

This application is based upon and claims the benefit of priority from the prior Japanese Patent Application No. 11-346461, Dec. 6, 1999, the entire contents of which are incorporated herein by reference.

BACKGROUND OF THE INVENTION

The present invention relates to a rough/fine movement drive mechanism of a focusing device, wherein rough/fine movement handles are operated for vertical rough/fine movement of a table, thereby effecting focusing, for example, on a sample of a microscope.

FIG. 1A and FIG. 1B schematically show a microscope described in Jpn. Pat. Appln. KOKAI Publication No. 10-26730. FIG. 1A is a plan view, and FIG. 1B is a left-side view. A revolver 2 is rotatably disposed at an upper part of a microscope body 1. An objective lens 3 is attached to the revolver 2. A lens-barrel 4 and an eyepiece 5 are provided on an optical axis of the objective lens 3.

A stage receiver 6 is vertically movably disposed at the microscope body 1. A stage 8 for mounting of a sample 7 is provided on the stage receiver 6. A left-side focusing handle 9, a right-side focusing handle 10 and a stage handle 11 are disposed at a lower part of the microscope body 1. The left-side focusing handle 9 is buried in the microscope body 1. If the left-side focusing handle 9 is projected like the right-side focusing handle 10, it would interfere with the stage handle 11.

With the microscope having this structure, the right-side focusing handle 10 or left-side focusing handle 9 is rotated to vertically move the stage receiver 6 and stage 8, thereby effecting focusing on the sample 7.

Since the left-side focusing handle 9 is buried in the microscope body 1, the focusing handle 10 and stage handle 11 are disposed symmetrical in the right-and-left direction. This enhances operability. In fact, since the frequency of use of the left-side focusing handle 9 is low, the right-hand focusing handle 10 alone is used in most cases.

FIG. 2 shows the structure of a focusing device of a microscope described in Jpn. Pat. Appln. KOKAI Publication No. 3-111805. A stationary cylinder 23 is fixed in a through-hole portion in the microscope body 20 by means of fixing screws 21, 22. A transmission shaft 24, a rough-movement coupling shaft 25 and a fine-movement coupling shaft 26 are rotatably engaged in succession within a hollow part of the stationary cylinder 23. Rough-movement rings 27 are disposed at both ends of the rough-movement coupling shaft 25. Rough-movement handles 28 are screwed on the rough-movement rings 27. Fine-movement rings 29 are disposed at both ends of the fine-movement coupling shaft 26. Fine-movement handles 30 are screwed on the fine-movement rings 29.

FIG. 3 shows a state in which the left-side rough-movement handle 28 and fine-movement handle 30, for example, are removed in the focusing device, and a cover 31 is attached to conceal the place of the removed elements. Similarly, the right-side rough-movement handle 28 and fine-movement handle 30 may be removed and a cover may be attached for concealment.

Although not shown, the rough-movement handle 28 and fine-movement handle 30 are disposed near the handle for the stage for mounting of the sample. If the operabilities of those handles are to be maintained, the handles need to be disposed very close to each other. As a result, the handles become difficult to operate.

The stage handle is disposed in the vertical direction with respect to the rough-movement handle 28 and fine-movement handle 30. Normally, it is disposed on one of the right and left sides.

As regards the microscope shown in FIG. 1, the stage handle 11 is disposed on the left side. In some cases, however, the stage handle 11 needs to be disposed on the right side from the standpoint of the operability for observation by the user.

In the case where the stage handle 11 is disposed on the right side, the microscope body 1 and focusing handle 10 cannot be shared with the case where the stage handle 11 is disposed on the left side. Moreover, the position of the stage handle 11 cannot be changed to the left side or right side, according to the user's preference.

The manufacturer is required to make two sets of the same microscope bodies 1 and focusing handles 10 for the left-side and right-side positioning of the stage handle 11. This makes the structure and manufacture complex.

On the other hand, the user is required to choose, from the beginning, a microscope provided with the left-side or right-side stage handle 11. To change the position of the stage handle 11 to the left side or to the right side after the purchase of the microscope requires considerable labor.

On the other hand, in the focusing device shown in FIGS. 2 and 3, when the rough-movement handle 28 and fine-movement handle 30 are to be attached/detached, bonding, for example, needs to be broken. The user is unable to perform modifications for detaching/attaching the rough-movement handle 28 and fine-movement handle 30. If both the right-side and left-side rough-movement handles 28 and fine-movement handles 30 are removed, the operation of the device is disabled.

BRIEF SUMMARY OF THE INVENTION

The object of the present invention is to provide a drive mechanism for a focusing apparatus, wherein a fine-movement handle can be attached/detached by a user with a simple work, while a space necessary for the operations of a stage and a space around the fine-movement handle can be provided.

In order to achieve the object, according to a first invention, there is provided a rough/fine-movement drive mechanism of a focusing device, comprising: a rough-movement coupling shaft, to both ends of which rough-movement handles are attached; a fine-movement coupling shaft rotatably provided coaxially with the rough-movement coupling shaft; a movement mechanism for vertically moving a stage in accordance with rotation of the rough-movement coupling shaft, and decelerating rotation of the fine-movement coupling shaft and moving the stage by an amount of movement less than an amount of movement provided by the rotation of the rough-movement coupling shaft; a fine-movement ring provided at each of both ends of the fine-movement coupling shaft, disposed outside each of the rough-movement handles, and having a smaller outside diameter than an outside diameter of each of the rough-movement handles; and a fine-movement handle detachably attached to at least one of the fine-movement rings.

According to a second invention, in the rough/fine-movement drive mechanism of a focusing device according to the first invention, the fine-movement handle has a cylindrical shape elongated in an axial direction of the fine-movement coupling shaft.

According to a third invention, in the rough/fine-movement drive mechanism of a focusing device according to the first invention, indices are put on a surface of the fine-movement ring, and lines indicating the indices are put on a circumferential portion of the fine-movement handle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows a state in which a left-side rough-movement handle and fine-movement handle are removed in the focusing device of the microscope shown in FIG. 2, and a cover is attached to conceal the place of the removed elements;

FIG. 4 is a front view of a microscope having a rough-movement/fine-movement drive mechanism of a focusing device according to a first embodiment of the present invention;

FIG. 5 is a side view of the microscope having the rough-movement/fine-movement drive mechanism of the focusing device according to the first embodiment of the invention;

FIGS. 9A and 9B show a fine-movement handle of a rough-movement/fine-movement drive mechanism of a focusing device according to a third embodiment of the invention; and FIGS. 10A and 10B show a fine-movement handle of a rough-movement/fine-movement mechanism of a focusing device according to a fourth embodiment of the invention.

Figure 1A:
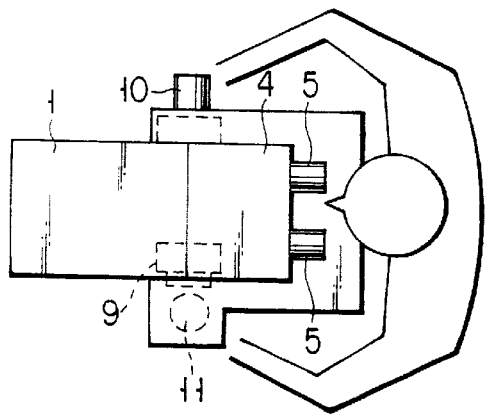
FIG. 1A is a top view of a conventional microscope.
Figure 1B:
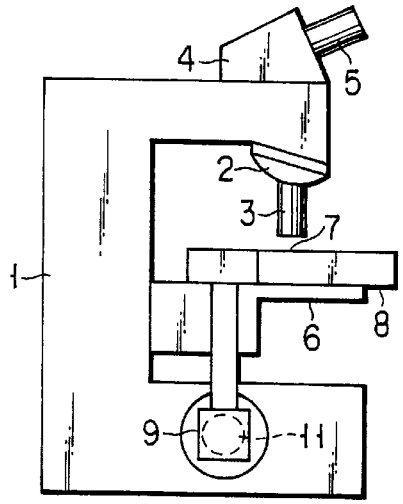
FIG. 1B is a left side view of the conventional microscope.
Figure 2:
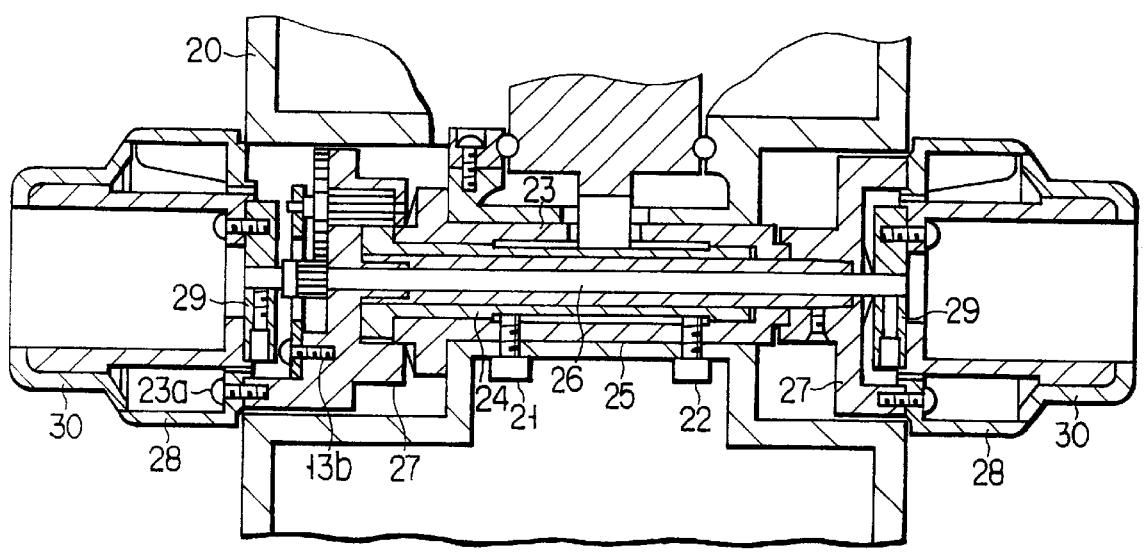
FIG. 2 is a focusing device of a conventional microscope.

DETAILED DESCRIPTION OF THE INVENTION (1) A first embodiment of the present invention will now be described with reference to the accompanying drawings.

FIG. 4 shows a whole structure of a microscope using a rough-movement/fine-movement drive mechanism of a focusing device of this invention, and FIG. 5 is a side view of the microscope. A revolver 41 is rotatably disposed at an upper part of a microscope body 40. A plurality of objective lenses 42 are attached to the revolver 41. The revolver 41 is rotated to selectively position a desired one of the objective lenses 42 on an observation optical path. A lens-barrel 43 and an eyepiece 44, which define the observation optical path, are disposed on the optical path of the objective lens 42.

In the microscope body 40, a stage receiver 45 is vertically movably supported by a guide. A stage 46 for mounting of a sample is fixed on the stage receiver 45.

In this microscope, a left-side fine-movement handle 47, a left-side rough-movement handle 48, a right-side rough-movement handle 49, a right-side fine-movement ring 50 and a left-side fine-movement ring 88 (to be described later) are rotatably provided on the microscope body 40 as focusing handles. The left-side fine-movement handle 47, left-side rough-movement handle 48, right-side rough-movement handle 49, right-side fine-movement ring 50 and left-side fine-movement ring 88 are respectively rotated to vertically move the stage 46. In addition, as shown in FIG. 4, a stage operation handle 51 for horizontally moving the stage 46 is provided on the right side of the microscope body 1.

Figure 6:
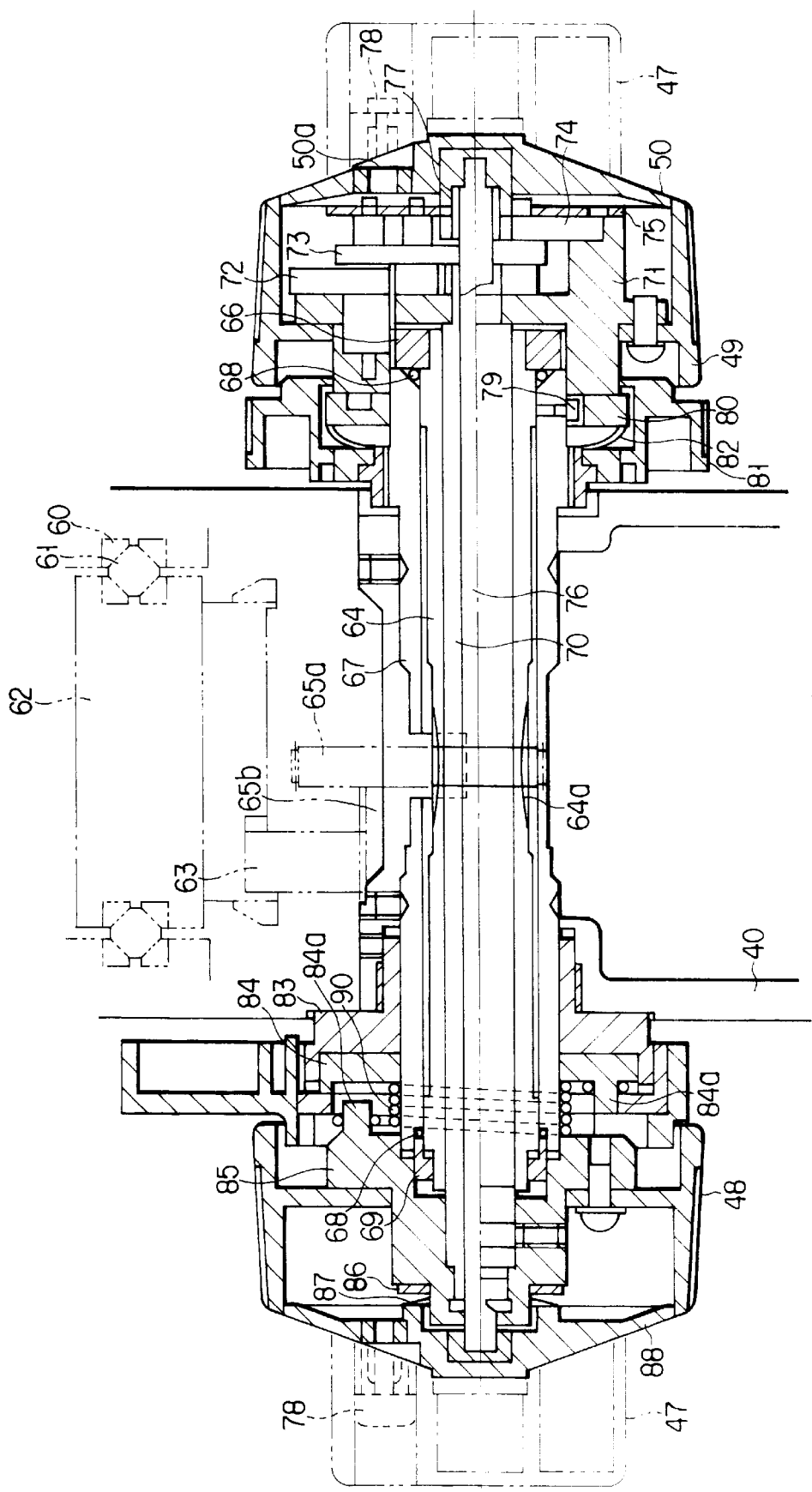
FIG. 6 is a cross-sectional view of a focusing handle unit of the rough-movement/fine-movement drive mechanism of the focusing device according to the first embodiment of the invention.

FIG. 6 is an A-A cross-sectional view showing the structure of the focusing handle section shown in FIG. 4. In the microscope body 40, a movement guide 62 is vertically movably supported by means of wires 60 and rollers 61. The stage receiver 45 is attached to the movement guide 62. A rack 63 is fixed to the movement guide 62 by means of screws, etc. (not shown). The rack 63 and a pinion gear 64a of a pinion shaft 64 are coupled by means of intermediate gears 65a, 65b supported on the microscope body 40.

A hollow focusing handle body shaft 67 is fixed to the microscope body 40 by means of screws, etc. The pinion shaft 64 and a gear 66, which are clamped and integrated by steel balls 68, are inserted in the hollow part of the focusing handle body shaft 67. Removal of the pinion shaft 64 and gear 66 is prevented by a stopper screw 69. The pinion shaft 64 is made integral with the gear 66 and rotatably supported on the focusing handle body shaft 67.

The pinion shaft 64 has a hollow part and a rough-movement coupling shaft 70 is inserted therein. The left-side rough-movement handle 48 and right-side rough-movement handle 49 are provided at both ends of the rough-movement coupling shaft 70. The rough-movement coupling shaft 70 is formed integral with a planetary gear body 71. The planetary gear body 71 is rotatably engaged and supported at a right end of the focusing handle body shaft 67.

The right side of the focusing handle will now be described. The right-side rough-movement handle 49 is formed integral with the planetary gear body 71 by means of screws, etc. A gear 72, a gear 73 and a gear 74 are engaged and supported at the planetary gear body 71, and are clamped and supported between the planetary gear body 71 and holding plate 75.

A fine-movement coupling shaft 76 is rotatably provided in a hollow part of the rough-movement coupling shaft 70. Accordingly, the rough-movement coupling shaft 70 and fine-movement coupling shaft 76 are coaxially rotated. The right-side fine-movement ring 50 is integrally disposed at the right end of the fine-movement coupling shaft 76. A fine-movement gear 77 is formed integral with the right-side fine-movement ring 50.

The fine-movement ring 50 is disposed outside the right-side rough-movement handle 49 and is formed to have a diameter less than the diameter of the right-side rough-movement handle 49. An engaging projection 50a is provided on the right-side fine-movement ring 50 near a center axis thereof.

Figure 7:
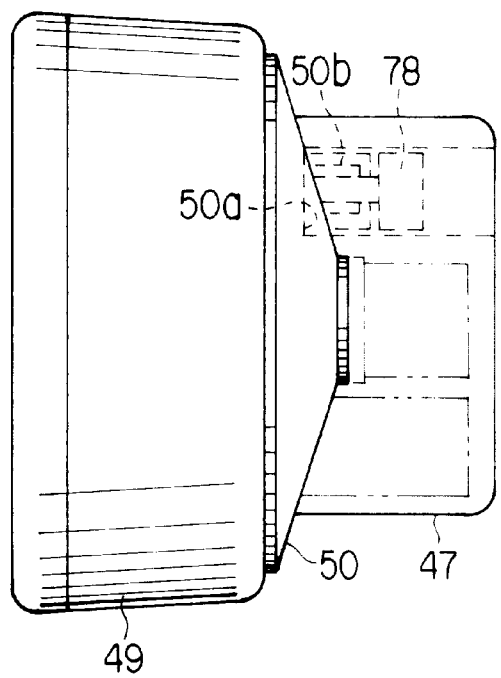
FIG. 7 shows a right-side fine-movement handle of the rough-movement/fine-movement drive mechanism of the focusing device according to the first embodiment of the invention.

The right-side fine-movement ring 50 is provided with a screw section for attaching/detaching the right-side fine-movement handle 47. The right-side fine-movement handle 47 has the same structure as the left-side fine-movement handle 47, and these fine-movement handles 47 are commonly used for the right and left sides. FIG. 7 shows the structure of the right-side fine-movement handle 47.

A counterbore 50a is formed at the screw section of the right-side fine-movement ring 50 which serves as a receiver for attachment/detachment of the right-side fine-movement handle 47. A cylindrical insert screw 50b is fixed under pressure in a screw section of the right-side fine-movement handle 47. A projecting portion of the insert screw 50b is engaged in the counterbore 50a of the right-side fine-movement ring 50, thereby facilitating alignment. In addition, the counterbore of the screw section functions as a hook recess for direct rotation of the right-side fine-movement ring 50. The right-side fine-movement handle 47 is attached to the right-side fine-movement ring 50 by means of a fixing screw 78.

A rotation stopper screw 79 is fixed at the right side of the focusing handle body shaft 67. A slide plate 80 has an axially elongated groove at its radially inside part. The axially elongated groove receives a head of the rotation stopper screw 79. The slide plate 80 is fitted on an outer periphery of the hollow focusing handle body shaft 67. The slide plate 80 and focusing handle body shaft 67 function as one piece in the rotational direction by virtue of the function of the rotation stopper screw 79. The slide plate 80 is supported axially movably.

A rough-movement load adjustment ring 81 is engaged with a threaded portion formed on an outer peripheral surface of the right side of the hollow focusing handle body shaft 67. The rough-movement load adjustment ring 81, if rotated, moves in the axial direction. A spring 82 is disposed between the rough-movement load adjustment ring 81 and slide plate 80. The spring 82 constantly urges the slide plate 80 onto the planetary gear body 71. Accordingly, if the rough-movement adjustment ring 81 is rotated to vary its urging force, the torque of the planetary gear body 71, that is, the right-side rough-movement handle 49, can be adjusted.

The left side of the focusing handle will now be described. A screw shaft 83 is formed integral with the microscope body 40. A rotary member 84 is provided with a projection at one location and is engaged and supported on the screw shaft 83.

A projection is formed on a rough-movement shaft 85 at one location at the same circumferential position as the projection 84a of the rotary member 84. By the function of a spring 90, the rotary member 84 and the projection 84a of the rotary member 84 are made integral with the rough-movement coupling shaft 70 in the contact state and are engaged and supported at the left end of the focusing handle body shaft 67.

The left-side rough-movement handle 48 is formed integral with the rough-movement shaft 85. A spacer 86 and a plate spring 87 are interposed between the left-side fine-movement ring 88 and the rough-movement shaft 85. The plate spring 87 lying between the left-side fine-movement:ring 88 and the spacer 86 produces a load torque of the right-side fine-movement ring 50 and left-side fine-movement ring 88, thus preventing natural rotation due to gravitation.

Similar with the case of the right-side fine-movement ring 50, the left-side fine-movement ring 88 is disposed outside the left-side rough-movement handle 48 and formed to have a smaller diameter than the left-side rough-movement handle 48.

A rough-movement stopper handle 89 is engaged with a threaded portion formed on a maximum-diameter portion of the screw shaft 83. The projection 84a of the rotary member 84 is abutted upon the projection of the rough-movement shaft 85 by the function of the spring 90. When the rough-movement stopper handle 89 is in the "OUT" state (i.e. loosened on the screw shaft 83), the projection 84a rotates in synchronism with the rough-movement handle 48. Since the projection 84a of the rotary member 84 is abutted upon the projection of the rough-movement shaft 85 by the function of the spring 90, the rough-movement handle 48 can make an almost one turn in such a direction as to move the stage 46 downward. In addition, when the rough-movement stopper handle 89 is set in the "ON" state (i.e. tightened on the screw shaft 83), the rotary member 84 is clamped and fixed between the rough-movement stopper handle 89 and the screw shaft 83. Accordingly, the rough-movement handle 48 is prevented from rotating in such a direction as to move the stage 46 upward.

The operation of the apparatus having the above-described structure will now be described.

When observation is performed in normal cases, the sample 7 is placed on the stage 46, and the stage operation handle 51 is rotated to move the stage 46. Thus, the sample 7 is positioned under the objective lens 42.

If the left-side fine-movement handle 47 is rotated, the rotation is transmitted to the planetary gears 77, 74, 73 and 72, gear 66, pinion gear 64a, intermediate gears 65a and 65b and rack 63 in the named order. Thus, the rotation of the left-side fine-movement handle 47 is decelerated. Thereby, the amount of movement per rotation of the left-side fine-movement handle 47 decreases and the stage 46 vertically moves (finely moves).

If the left-side or right-side rough-movement handle, 48, 49, is rotated, the rotation is directly transmitted to the pinion shaft 64 and is not decelerated by the planetary gear body 71. Compared to the fine movement, the amount of movement per rotation increases by a degree corresponding to the deceleration. The stage 46 is thus vertically moved (roughly moved).

While the eyepiece 44 is being viewed, the rough-movement stopper handle 89 is set in the "OUT" state and the left-side fine-movement handle 47 and the left-side or right-side rough-movement handle, 48, 49 are rotated. Thus, focusing on the sample 7 is effected.

In the example shown in FIG. 4, since the stage operation handle 51 is positioned on the right side, the right-side fine-movement handle 47 is not attached. If the right-side fine-movement handle 47 is attached, the right-side fine-movement handle 47 and the stage operation handle 51 are positioned close to each other and the operabilities of both are degraded. Since the stage operation handle 51 is movable only in the front-and-rear direction, as shown in FIG. 4, it is possible to operate the stage operation handle 51 and right-side fine-movement ring 50, for example, by the right hand.

Since the recess is formed on the side surface of the right-side fine-movement ring 50, if the fingertip, for instance, is put in the recess to rotate it, a fine-movement operation can be performed in the same manner as the right-side fine-movement handle 47 is rotated. The same fine-movement operation can also be performed by rotating the left-side fine-movement ring 88.

Where the stage operation handle 51 is positioned on the left side, as viewed from the front, the left-side fine-movement handle 47 may be removed and attached to the right-side fine-movement ring 50. This modification work can easily be made by the user. In this work, a standard tool attached as an accessory to the microscope is used. The fixing screw 78 is loosened and the left-side fine-movement handle 47 is removed. The removed left-side fine-movement handle 47 is then fitted on the right-side fine-movement ring 50 at the position of the fixing screw 78 and pushed into the guide. Thereafter, the fixing screw 78 is tightened once again by the standard tool, and the work is completed.

If the right-side/left-side fine-movement handle 47 is removed, the space near the focusing handle can be increased. Since access to the microscope from the outside is permitted, for example, the frame of a manipulator can be approached to the sample 7, a great advantage can be obtained from the standpoint of the problem of vibration.

As regards microscopes, there are cases where an external unit is mounted to the focusing section for auto-focusing (the fine-movement shaft is rotated by a motor for automatic focusing) or front-operation (the fine-movement handle and rough-movement handle are disposed on the front side in a case where it is not desired to extend the hand to the depth of the microscope). Normally, the maker completes such modification before delivery, or a service engineer visits the user for modification. In the apparatus of this invention, however, the right-side/left-side fine-movement ring, 50, 88, has the axial-alignment projection and fixing screw. Thus, if the external unit is designed to permit engagement and screw-attachment, the user can easily attach/detach the unit.

According to the first embodiment of the invention, the mechanism is provided with the fine-movement rings 50 and 88 and the fine-movement handle 47. The fine-movement rings 50 and 88 are provided at both ends of the fine-movement coupling shaft 76 and are disposed outside the rough-movement handles 48 and 49 in the axial direction of the rough-movement coupling shaft 70. The outside diameter of the fine-movement ring 50, 88 is less than that of the rough-movement handle 48, 49. The fine-movement handle 47 is detachably attached to one or both of the fine-movement rings 50 and 88. Therefore, the space around the right-side/left-side fine-movement handle 47 can be increased, and the fine-movement handle 47 can easily be detached/attached. Moreover, even if the fine-movement handle 47 is not attached, the rotating operation can easily be performed, and the external unit can easily be attached.

The following modifications may be made in the first embodiment. The right-side/left-side fine-movement ring 50, 88 may be engaged by any means if axial-alignment is ensured. For example, holes may be made at three locations, or engagement may be effected with rectangular means. Moreover, a shaft shape may be substituted for the hole shape.

The recess for rotational operations, which is formed at the right-side/left-side fine-movement ring 50, 88, may be of any shape if it permits easy rotation by the fingertip. If space permits, a projecting shape may be adopted.

The screw for fixing the fine-movement handle is not limited if it permits easy attachment/detachment. Patching may be adopted.

The shape of the fine-movement handle 47 is not limited if it permits easy rotation. As regards the material thereof, for example, the insert may be formed of resin, metal, etc., and the handle portion may be rubber-coated, etc.

(2) A second embodiment of the present invention will now be described with reference to the accompanying drawings.

Figure 8:
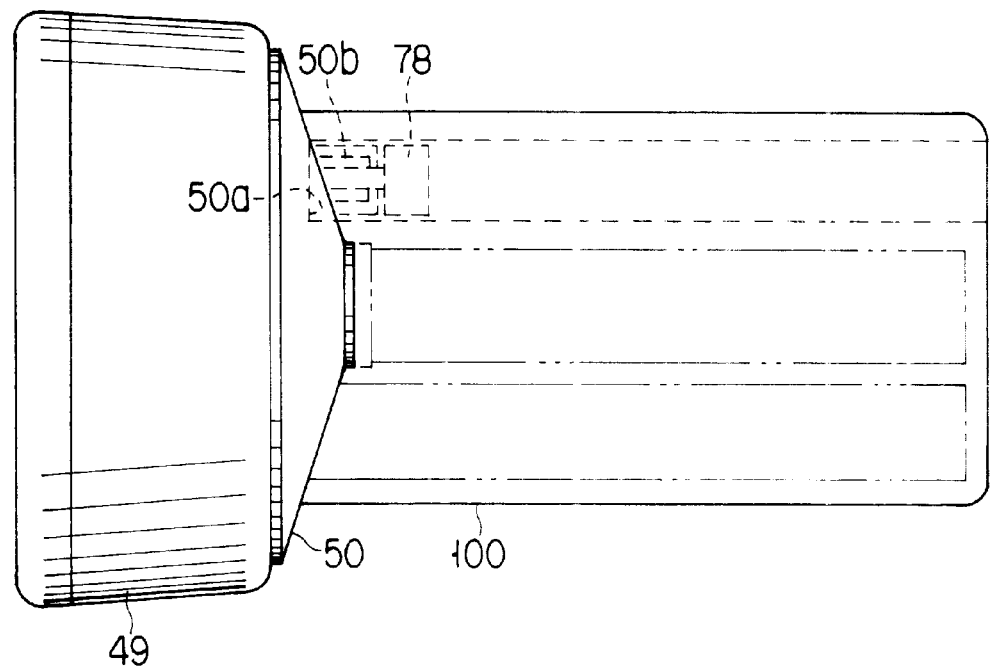
FIG. 8 shows a fine-movement handle of a rough-movement/fine-movement drive mechanism of a focusing device according to a second embodiment of the invention.

FIG. 8 shows the structure of a fine-movement handle used in the rough/fine-movement drive mechanism of the focusing device according to the present invention. An elongated fine-movement handle 100 is attached/detached to/from the right-side fine-movement ring 50 by means of the fixing screw 78. The elongated fine-movement handle 100 is made longer than the fine-movement handle 47 shown in FIG. 7 by a predetermined length.

In the structure of the microscope shown in FIG. 4, the stage receiver 45 and stage 46 may, in some cases, be disposed just above the rough-movement handle 48 or 49 and the fine-movement handle 47 in order to enhance the operability for attachment/detachment of the sample 7. If the sample 7 is placed at a lower level, the hands are less tired. In such a case, the fine-movement handle. 47 shown in FIG. 7 is too short. If the fine-movement handle 47 is to be rotated by the fingers, the fingers come in contact with the stage receiver 45, etc., and the operability will deteriorate.

By contrast, if the elongated fine-movement handle 100 shown in FIG. 8 is attached, good operability is attained since the operating section of the elongated fine-movement handle 100 is extended outward beyond the stage receiver 45, etc. According to the structure, one elongated fine-movement handle 100 is attached as an accessory to the microscope of the type wherein the stage 46 is disposed at a lower level. If the fine-movement handle is short, the operability will inevitably deteriorate. Thus, this combination is not determined by the user's choice.

In the second embodiment, the elongated fine-movement handle 100 is detachably attached to the right-side fine-movement ring 50 by means of the fixing screw 78. Therefore, in addition to the advantage of the first embodiment, the operability of the fine-movement handle 100 can be ensured, while an obstacle is avoided.

(3) A third embodiment of the present invention will now be described with reference to the accompanying drawings.

FIGS. 9A and 9B show the structure of a fine-movement handle used in the rough/fine-movement drive mechanism of the focusing device according to the present invention. FIG. 9A is a side view, and FIG. 9B is a view of the fine-movement handle, as viewed in the axial direction. Line indices 101 are put on an S surface of the right-side rough-movement handle 49 at a boundary between the right-side rough-movement handle 49 and the right-side fine-movement ring 50. The line indices 101 are marked, for example, at four locations at angular intervals of 90°.

On the other hand, line indices 102 are marked on an inclined surface of the right-side fine-movement ring 50. Numerals added to the line indices 102 represent the amount of movement ($\mu$m).

If the line indices 102 are put on the right-side fine-movement ring 50, the indication can be read even if the fine-movement handle 49, for instance, is not provided. Normally, when the indication is read, the amount of movement can be calculated by subtracting a numerical value obtained after movement of the stage 46 from a numeral value before the movement which has been written down in advance.

According to the third embodiment, the index-indication on the amount of fine movement can be read from the front side of the microscope, without greatly shifting the user's gaze.

The line indices may be put on the left-side fine-movement ring 88 at the left-side rough-movement handle 48, instead of the right-side fine-movement ring 50 at the right-side rough-movement handle 49.

(4) A fourth embodiment of the present invention will now be described with reference to the accompanying drawings.

FIGS. 10A and 10B show the structure of a fine-movement handle used in the rough/fine-movement drive mechanism of the focusing device according to the present invention. FIG. 10A is a side view, and FIG. 9B is a view of the fine-movement handle, as viewed in the axial direction.

A fine-movement handle 103 is provided with a stepped portion 104 with a large diameter at the circumferential surface thereof. Line indices 105 are put on the stepped portion 104. The line indices 105 indicate the amount of movement of the stage 46.

On the other hand, line indices 106 are put on a circumferential portion of the right-side rough-movement handle 49, at a boundary between the right-side rough-movement handle 49 and the right-side fine-movement ring 50. The line indices 106 are marked, for example, at four locations at angular intervals of 90°.

According to the third embodiment, there is no need to incline the head while the ordinary microscope as shown in FIG. 4 is being used. Only by slightly lowering the user's gaze, the indication can be read. When the elongated fine-movement handle 100 shown in FIG. 8 is used, that is, when the upper part of the focusing handle is covered by the state, etc. and the fine-movement indices are not easily read from the lateral side, the line indices 105 can be read from the front side of the microscope and the visual recognition is facilitated.

The line indices may be put on the left-side fine-movement ring 88 at the left-side rough-movement handle 48, instead of the right-side fine-movement ring 50 at the right-side rough-movement handle 49.

As has been described above in detail, the present invention can provide a rough/fine-movement drive mechanism of a focusing device wherein the fine-movement handle can be attached/detached by a simple work by the user and a space necessary for the operation of the stage as well as a space around the fine-movement handle can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A rough/fine-movement drive mechanism of a focusing device, comprising:
   a rough-movement coupling shaft, to both ends of which rough-movement handles are attached;
   a fine-movement coupling shaft rotatably provided coaxially with the rough-movement coupling shaft;
   a movement mechanism for vertically moving a stage in accordance with rotation of the rough-movement coupling shaft, and decelerating rotation of the fine-movement coupling shaft and moving the stage by an amount of movement less than an amount of movement provided by the rotation of the rough-movement coupling shaft;
   a fine-movement ring provided at each of both ends of the fine-movement coupling shaft, disposed outside each of the rough-movement handles, and having a smaller outside diameter than an outside diameter of each of the rough-movement handles; and
   a fine-movement handle detachably attached to at least one of the fine-movement rings.

2. A rough/fine-movement drive mechanism of a focusing device, according to claim 1, wherein the fine-movement handle has a cylindrical shape elongated in an axial direction of the fine-movement coupling shaft.

3. A rough/fine-movement drive mechanism of a focusing device, according to claim 1, wherein indices are put on a surface of the fine-movement ring, and lines indicating said indices are put on a circumferential portion of the fine-movement handle.

4. A microscope comprising:
   a light source;
   a stage for mounting of a sample;
   an illumination optical system for guiding light from the light source onto the sample mounted on the stage;
   an objective lens for converging observation light of the sample of the illumination light guided by the illumination optical system; and
   a focusing device for varying a relative distance between the objective lens and the stage:
   wherein the focusing device comprises,
      a rough-movement coupling shaft, to both ends of which rough-movement handles are attached;
      a fine-movement coupling shaft rotatably provided coaxially with the rough-movement coupling shaft;
      a movement mechanism for vertically moving a stage in accordance with rotation of the rough-movement coupling shaft, and decelerating rotation of the fine-movement coupling shaft and moving the stage by an amount of movement less than an amount of movement provided by the rotation of the rough-movement coupling shaft;
      a fine-movement ring provided at each of both ends of the fine-movement coupling shaft, disposed outside each of the rough-movement handles, and having a smaller outside diameter than an outside diameter of each of the rough-movement handles; and
      a fine-movement handle detachably attached to at least one of the fine-movement rings.

5. A microscope according to claim 4, wherein the fine-movement handle has a cylindrical shape elongated in an axial direction of the fine-movement coupling shaft.

6. A microscope according to claim 4, wherein indices are put on a surface of the fine-movement ring, and lines indicating said indices are put on a circumferential portion of the fine-movement handle.

* * * * *